United States Patent [19]
Gross

[11] 3,739,811
[45] June 19, 1973

[54] FOUR-WAY VALVE

[76] Inventor: Frederick A. Gross, 212 N. Gramercy Place, Los Angeles, Calif. 90004

[22] Filed: Aug. 14, 1971

[21] Appl. No.: 174,567

Related U.S. Application Data

[62] Division of Ser. No. 42,226, June 1, 1970, Pat. No. 3,657,925.

[52] U.S. Cl. .......................................... 137/625.27
[51] Int. Cl. ............................................. F16k 11/00
[58] Field of Search ................. 137/625.27, 625.69, 137/625.25

[56] References Cited
UNITED STATES PATENTS
3,315,812  4/1967  Lewis et al................. 137/625.27 X FOREIGN PATENTS OR APPLICATIONS
780,071   10/1934  France........................... 137/625.27
1,365,201  4/1963  France........................... 137/625.27

Primary Examiner—Henry R. Klinksiek
Assistant Examiner—Robert J. Miller
Attorney—Ostrolenk, Faber, Gerb et al.

[57] ABSTRACT

A four-way valve is formed of an elongated channel which contains a stack of hollow valve cages. The cages have end portions which form spaced poppet valve seats for poppet valve disks which are carried on a common operating shaft.

7 Claims, 9 Drawing Figures

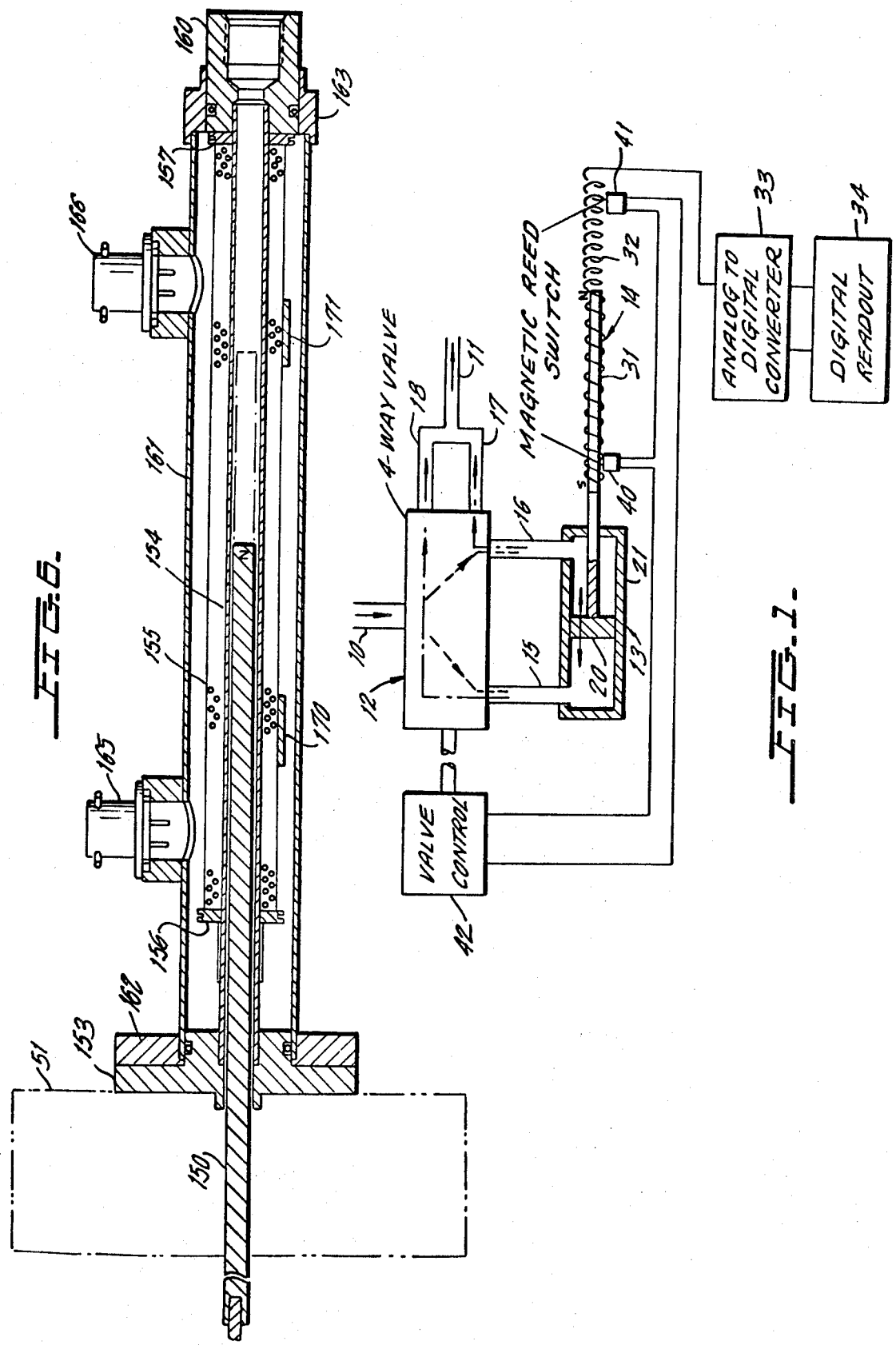

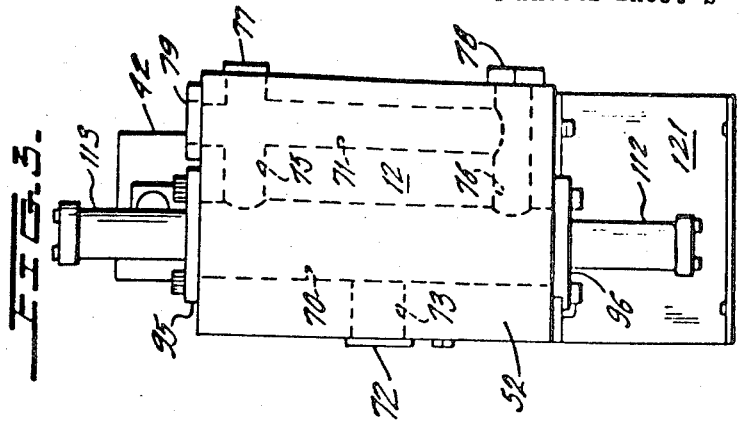
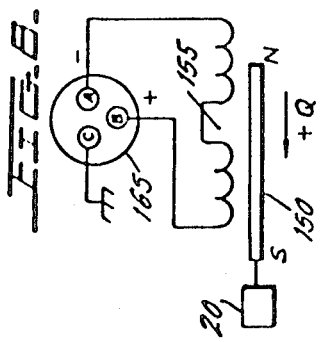
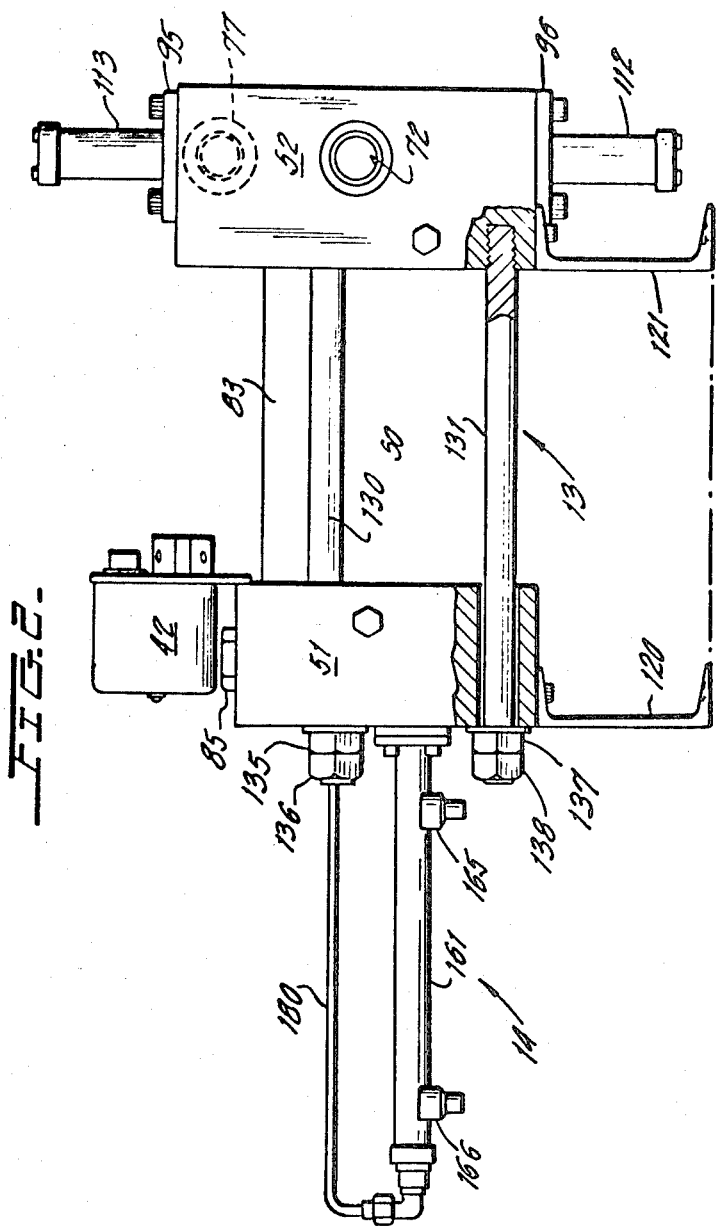
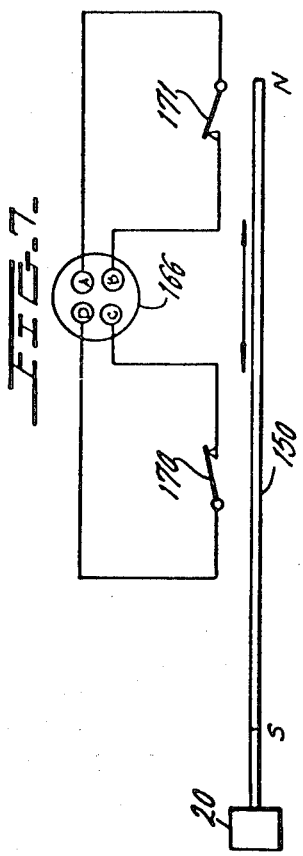

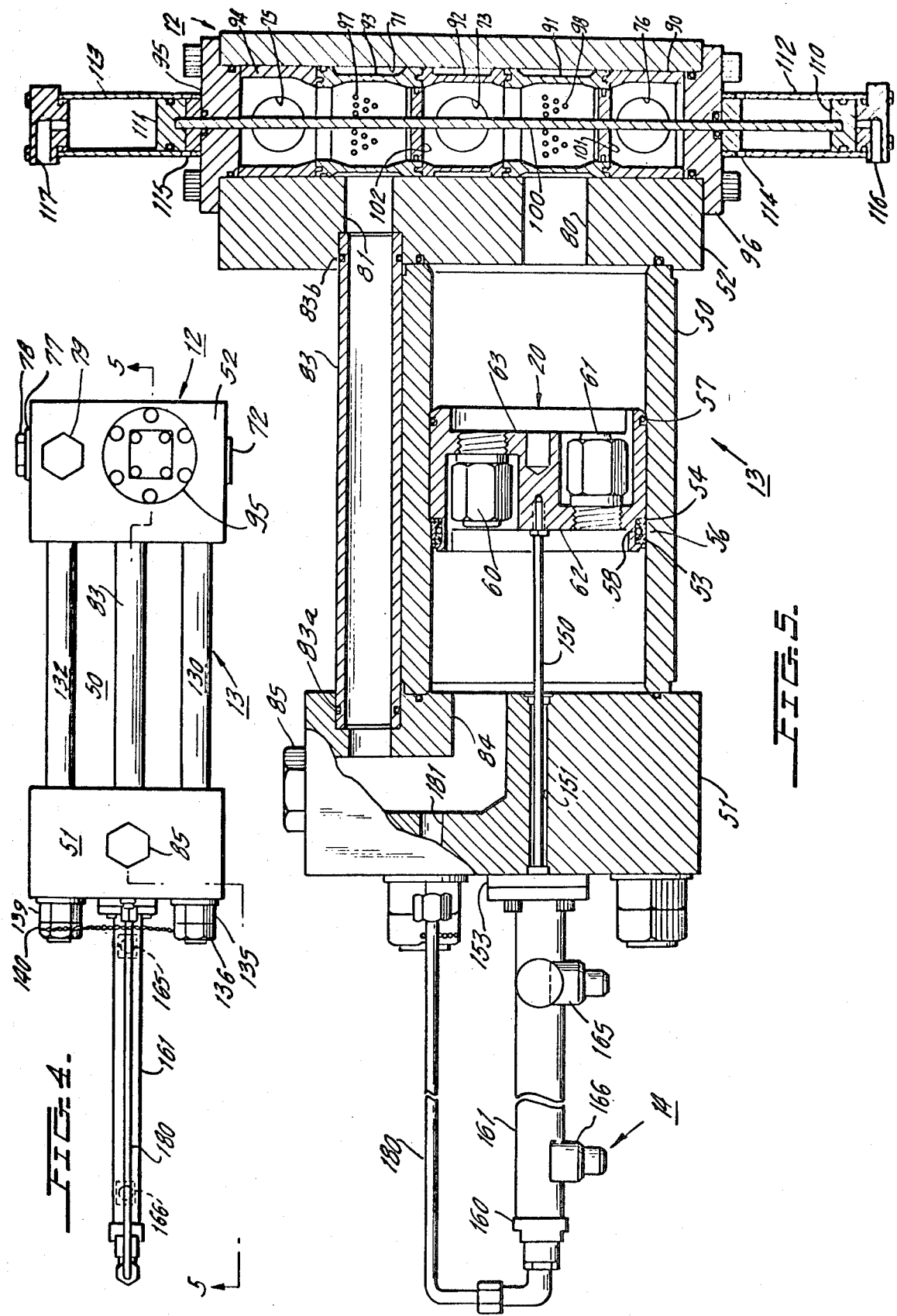

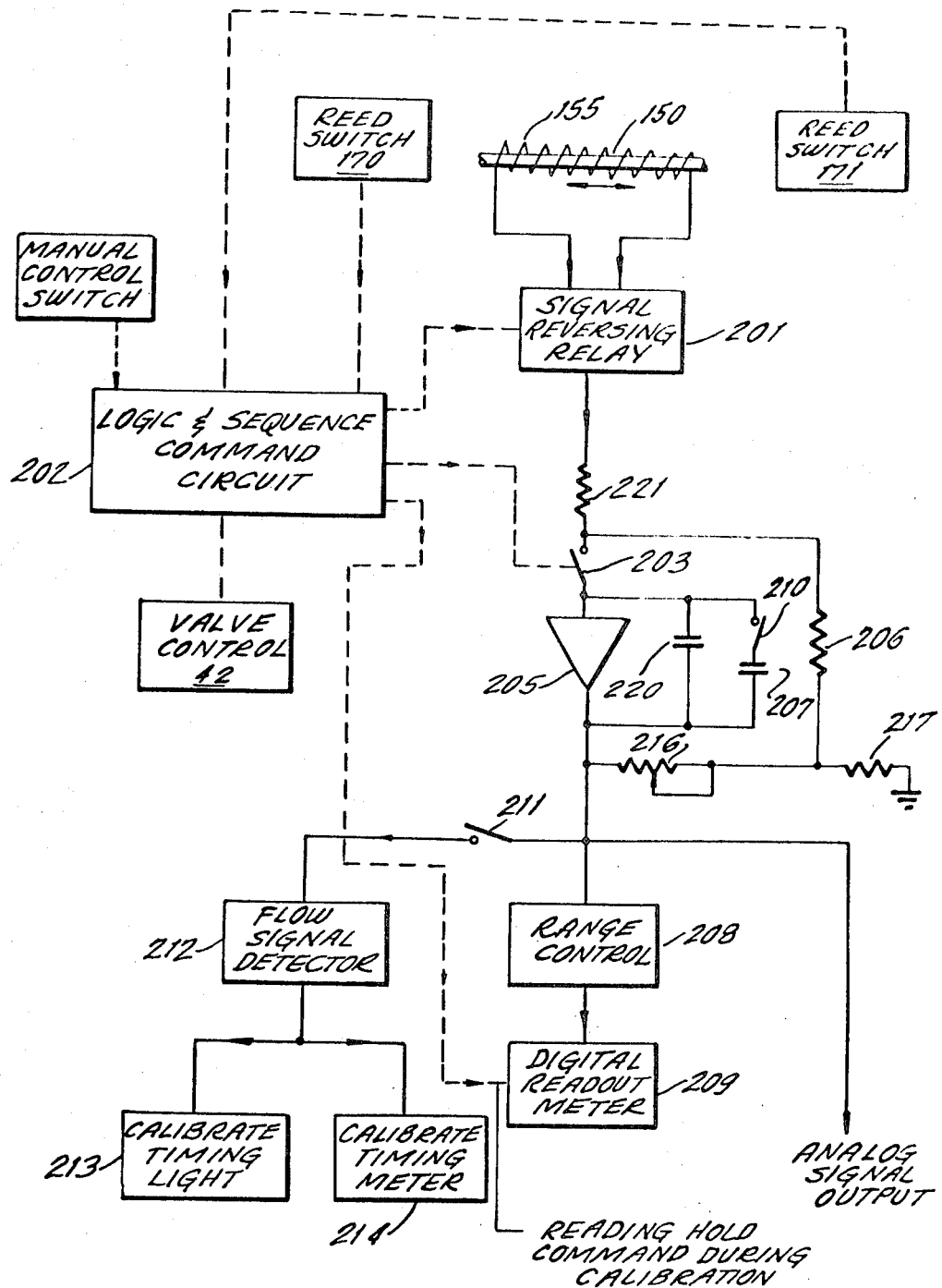

FOUR-WAY VALVE

RELATED APPLICATIONS

This application is a division of my copending application Ser. No. 42,226, filed June 1, 1970, entitled POSITIVE DISPLACEMENT FLOWMETER, and assigned to the assignee of the present invention now U.S. Pat. No. 3,657,925.

BACKGROUND OF INVENTION

This invention relates to flowmeters, and more particularly relates to the combination of a continuously cycled four-way valve, a reciprocated piston connected to the valve which is driven by the fluid whose volumetric flow rate is to be measured, and a transducer for measuring the rate of mechanical movement of the piston. This invention also relates to the construction of individual components of the above combination, and to the control circuit used for the control of the combination.

PRIOR ART

Volumetric flow rate meters are well known and are shown, for example, in U.S. Pat. No. 2,934,938 to Rhoades, and assigned to the assignee of the present invention. In this patent there is shown a combination of a valve for admitting fluid, whose rate of movement is to be measured against one side and then the other of a piston moving within a cylinder. The piston is then mechanically connected to a rotating shaft (of a potentiometer) and the rate of movement of the piston is measured from the rotation of the shaft to which it is connected.

One disadvantage of such devices is that it is necessary to pass a physical connection through the cylinder and to seal this region. Moreover, the recycling of the device requires complex circuitry.

Another example of a prior art flowmeter is given in U.S. Pat. No. 3,030,800 to Herman, in which the two bellows share a common diaphragm with fluid being alternately admitted and withdarwn from opposite sides of the diaphragm. The diaphragm motion is reversed when it reaches an end position, determined by the placement of contacts which engage the diaphragm. In this type arrangement, it is not possible to obtain information as to fluid displacement at any instant.

SUMMARY OF THE INVENTION

Three major components form the flowmeter of the invention. These are:

a. A four-way, open center valve controls the direction that main line flow takes through a piston-cylinder assembly;

b. A piston-cylinder assembly in which the piston is reciprocated (under the action of the four-way valve) by the fluid flow being monitored and moves at a rate related to the volumetric flow rate of the fluid being monitored. Bidirectional pressure relief valves are opened when the pressure differential across the piston exceeds a given value.

c. A velocity transducer and piston position indicator consisting of a movable permanent magnet probe surrounded by an elongated output signal winding. The movable probe is within a sealed housing which communicates with the system pressure so that it is not necessary to pass a movable member through a seal to obtain an output measurement. Magnetically operated reed switches, operated by the permanent magnet probe, are disposed adjacent the end points of the probe travel to operate control valves for recycling the four-way valve, and thus the piston motion.

This novel structure provides a positive displacement flowmeter which can measure flow rates over a range greater than 500:1, and at pressures up to and exceeding 3,000 psig. The instrument is completely sealed so that it can handle fluids having a wide range of viscosity, chemical activity and particulate contamination. A minimum pressure drop is introduced into the measured circuit during either steady-state or transient flow. An analog output signal, which can be digitally displayed, is continuously provided, related to the instantaneous volumetric flow. The device is also made fail-safe so that fluid flow can continue in the circuit being monitored, even though the automatic cycling capability of the instrument is interfered with. That is, the instrument will support only a given pressure differential between its input and output fluid terminals before the safety valves in the piston open.

A novel control circuit is then provided for the device which delivers a constant output signal having a unidirectional polarity and which is blanked during piston reversal. The control circuit provides capability of calibration and manual recycling operation.

BRIEF DESCRIPTION OF THE DRAWINGS

FIG. 1 schematically illustrates the combination of the invention.

FIG. 2 is a side plan view of a preferred embodiment of the apparatus of the invention.

FIG. 3 is a right-hand end view of FIG. 2.

FIG. 4 is a top view of FIG. 2 with the solenoid control valve removed.

FIG. 5 is a cross-sectional view of FIG. 4 taken across section line 5—5 in FIG. 4.

FIG. 6 is a cross-sectional view of the transducer assembly of FIG. 5.

FIG. 7 schematically illustrates the arrangement of the magnetically responsive reed switches of FIG. 6.

FIG. 8 schematically illustrates the arrangement of the elongated winding of the transducer of FIG. 6.

FIG. 9 schematically illustrates the novel readout and control circuit of the invention in block diagram form.

DETAILED DESCRIPTION OF THE PREFERRED EMBODIMENTS

The combination of the invention is shown schematically in FIG. 1 and includes an input conduit 10 and output conduit 11. Conduits 10 and 11 conduct a fluid whose volumetric flow rate is to be measured. The instrument of the invention is connected in line with conduits 10 and 11 and includes a four-way valve 12, a cylinder-piston assembly 13, and a piston-velocity transducer 14. Four-way valve 12 has the capability of connection conduit 10 to one of conduits 15 or 16, and of connecting only one of the other of conduits 15 or 16 to their respective conduits 17 or 18. Valve operation has the effect of reversing the connection of conduit 10 to conduits 15 and 16 and reversing the connection of conduits 15–18 or 16–17. Thus, in a first valve position, and as shown by dotted lines, a fluid flow path is established from conduit 10 to conduit 15 and from conduit 16 to conduit 17. In a second valve position, and as shown in the dot-dash line in FIG. 1, a fluid flow path is established from conduit 10 to conduit 16 and from conduit 15 to conduit 18. Clearly, by appropriately cycling valve operation, a continuous flow of material will take place between conduits 10 and 11, with piston 20 disposed within cylinder 21 which receives conduits 15 and 16 at its ends, moving with reciprocal motion, and at a rate determined by its diameter and by the volumetric flow rate of the fluid driving the system.

The rate of movement of piston 20 is measured by transducer 14 which includes an elongated rod 30 connected to piston 20. Rod 30 is terminated by a permanent magnet 31 (and may itself be an elongated permanent magnet) which is moved along the length of a relatively stationary helical winding 32. The voltage induced between the terminals of winding 32 is related to the instantaneous rate of movement of permanent magnet 31 and this output voltage can be displayed by a suitable meter, calibrated in terms of volumetric flow rate. Alternatively, the output voltage of winding 32 can be connected to a suitable analog-to-digital converter 33 and displayed in a digital readout device 34.

Transducer 14 is also used to control the cycling of four-way valve 12. Thus, a pair of magnetic field responsive switches 40 and 41 are fixed at points along the movement of permanent magnet 31 corresponding to the end positions for motion of piston 30 in cylinder 31. Switches 40 and 41 are then connected to a suitable valve control structure 42 which is capable of switching four-way valve 12 whereby, when piston 20 reaches the end of its left-hand movement, switch 40 operates four-way valve 12 from the dot-dash line condition to the dotted line condition. The fluid being monitored will then flow into the left-hand end of cylinder 21 and out of the right-hand end, thereby to drive piston 20 to the right. When piston 20 reaches the end of its motion to the right, switch 41 is actuated by magnet 31 and the valve 12 is again operated to reverse the direction of movement of piston 20.

FIGS. 2 to 6 show a flowmeter which is built following the principles of FIG. 1. Referring to these figures, components similar to those of FIG. 1 have the same identifying numerals.

The piston cylinder assembly 13 is best shown in FIG. 5 and includes a cylindrical barrel 50 mounted in sealed relation at its opposite ends to cylinder heads 51 and 52 at the transducer end and valve end, respectively, of the assembly. A piston 20 is slidably received within barrel 50 and a low friction sliding connection is formed by sealing ring 56, bounded by piston shoes 53 and 54 and, at the opposite end of the piston, by sealing ring 57. Sealing ring 56 is U-shaped in cross-section, and is pressed outwardly in preloaded contact by "O" ring 58 to form a sliding seal between piston 20 and the interior diameter of barrel 50. Deformation of "O" ring 58 prevents fluid flow through the area of connection of "O" ring 58 and the surface of piston 20, or the interior surface of ring 56.

To prevent the development of excessive differential pressures across piston 20, the piston can be fitted with suitable pressure relief valves such as valves 60 and 61 which are threadably received by the piston. Obviously, such relief valve structures can be built into piston 20 rather than using removable valve assembly 60 and 61. Valve 60 will open responsive to a pressure differential greater than a given value in one direction across piston 20 while valve 61 will open responsive to a pressure differential greater than a given value in the opposite direction. Note that the opposite piston surfaces 62 and 63 are recessed so that they will communicate with openings in cylinder heads 51 and 52 even though the piston 20 is in engagement with one of these heads.

The four-way valve 12 is best shown in FIGS. 3 and 5, and is formed in the cylinder head 52. Cylinder head 52 has longitudinal channels 70 and 71 formed therein (FIG. 3). A pressure port 72 terminates channel 73 which communicates with a central portion of channel 70 while return channels 75 and 76 communicate with opposite ends of channel 70 and are connected together by channel 71 to a common return port 77 (FIGS. 2 and 3). Channel 76 is plugged by cap 78 and the top of channel 71 is plugged by cap 79. As best shown in FIG. 5, a channel 80 communicates between the interior of barrel 50 and enters channel 71 between channels 73 and 76 while channel 81 extends into channel 71 between channels 73 and 75. A recirculating tube 83 is connected to channel 81 and extends to head 51 and communicates with the left-hand side of piston 20 through channel 84. Note that suitable "O" rings 83a and 83b and back-up rings are provided for tube 83. The exterior of channel 84 is plugged by cap 85. (It may be noted at this point that conduit 73 corresponds to conduit 10 of FIG. 1; conduits 81–83–84 correspond to conduit 15 of FIG. 1; conduit 80 corresponds to conduit 16 of FIG. 1; and conduits 75 and 76 correspond to conduits 18 and 17, respectively, of FIG. 1.)

A plurality of end-to-end connected cylindrical valve cages 90 to 94 are sealed within channel 70 and are held therein by seal caps 95 and 96. Note that the inner diameters of the cages 90 to 94 are reduced at regions where the cages are connected to one another. Note that the walls of cages 91 and 93 are perforated by perforations 97 and 98, respectively, to permit unrestricted flow of fluid to and from channels 81 and 80, respectively. Obviously, other forms of perforations, such as slots and the like, could be used for this purpose.

The shaft 100 and disks 101 and 102 can be operated from the position shown to an upper position in which disk 102 is disposed between cages 93 and 94 and in which disk 101 is disposed between cages 91 and 92. One suitable operating mechanism for the valve shaft 100 consists of air operated pistons 110 and 111 which bear against the opposite ends of shaft 100 and move within cylinders 112 and 113, respectively. Cylinders 112 and 113 have discharge ports 114 and 115 at their bottoms and air pressure connection ports 116 and 117 at their outer ends. The application of pressure to port 117 alone drives piston 111 and thus rod 100 downward to set valve disks 101 and 102 in the position shown. Application of air pressure to port 116 alone moves piston 110 and thus rod 100 upward to seal disks 101 and 102 in their upper position previously described.

Air pressure for operation of pistons 110 and 111 is supplied from solenoid operated valve 42 over pressure connection (not shown). Solenoid valve 42, shown in FIGS. 2 and 3, may be of any suitable commercially available variety in which, through the operation of one of a pair of contacts, high pressure air will be connected to a respective one of ports 116 or 117 in FIG. 5. Conveniently, valve 42 may be mounted on head 51, as shown, with the entire apparatus supported on mounting flanges 120 and 121 connected to heads 51 and 52, respectively. Heads 51 and 52 are then drawn toward one another and fixed relative to one another by four rods, three of which are shown in FIGS. 2 and 4 as rods 130, 131 and 132. A fourth rod will be disposed behind rod 131 in FIG. 2 and behind rod 132 in FIG. 4. Each of these rods is passed through suitable through-openings in head 51, such as through-opening 133 for rod 131 in FIG. 2, and are threaded into suitable tapped openings in head 52, such as tapped opening 134 in FIG. 2. The left-hand end of each of the rods 130, 131 and 132 is threaded, and is secured by a full nut and then a jam nut, shown as nuts 135–136, 137–138 and 139–140 for rods 130, 131 and 132, respectively.

The velocity transducer 14 which measures the velocity of piston 20 is best shown in FIG. 6. Thus, an elongated permanent magnet rod 150 extends from piston 20, as shown in FIG. 5, through opening 151 in head 152 (FIG. 5), through cap 153 and into the interior of elongated sleeve 154, which is secured to cap 153. Note that this is not a sliding seal, since the interior of sleeve 154 will be at the same pressure as the interior of barrel 50. Sleeve 154 serves as the bobbin of a multilayer winding 155 with flanges 156 and 157 completing the bobbin.

The right-hand end of sleeve 154 in FIG. 6 is connected to an end cap 160. An outer sleeve 161 encloses sleeve 154 and is secured to cap 153 by flange 162 and to cap 160 by adaptor 163.

Outer sleeve 161 carries two electrical connectors 165 and 166. Connector 165, as shown in FIG. 8, is a three-pin connector, two of its pins receiving the ends of winding 155. The polarity marking shown is for motion of magnet 150 to the left in FIGS. 6 and 8. Connector 166 is a four-pin connector, as shown in FIG. 7, and receives the terminals of permanent magnet actuated reed switches 170 and 171 (corresponding to switches 41 and 50 of FIG. 1). Reed switches 170 and 171 are commercially available switches and are held in place relative to magnet 150 as by taping or cementing to coil 155. When the end of magnet 150, marked as a North pole in FIG. 6, is adjacent one of reed switches 170 or 171, the switch will close. Note that other reed switches could be located along the path of movement of various control functions.

The structure is completed by a pump-back tube 180 which extends from the interior of sleeve 154 to channel 181 in head 51 (FIG. 6) and then to channel 84 in head 51. This connection permits pressure equalization behind the end of rod 150 as the rod is moved by piston 20. A suitable support structure, not shown, may extend from head 51 to the outer end of sleeve 161 to help support the sleeve 161 and assembly 14 in cantilever.

In operation, the device of the invention is connected in line with a system carrying a fluid whose volumetric flow rate is to be measured. Thus, the system is connected between pressure port 72 and return port 77 (FIG. 2). It is first assumed that fluid flow is from pressure port 72 to return port 77 (fluid flow could be reversed from this direction or could be bidirectional and the instrument will continue properly to indicate volumetric flow rate) and that the components are in the position of FIG. 5. It is also assumed that all barrels and chambers are filled with the system fluid. The fluid from pressure port 72 flows through channel 73, into channel 80 and into the chamber to the right of piston 20. The piston 20 is, therefore, moved to the left, with the fluid filling the chamber to the left of piston 20 flowing through channel 84, conduit 83, channel 81, and return port 75 to return port 77. During this movement, permanent magnet rod 150 is moved to the left in FIG. 5, with fluid in pump-back tube 180 discharging through channel 181 and into conduit 83. As the permanent magnet 150 moves through winding 155, a voltage is induced in this winding which is related to the speed of rod 150 and thus to the volumetric flow rate which moves piston 20. This voltage is then displayed, if desired, in a digital display, as shown in FIG. 1.

As rod 150 approaches the end of its travel to the left in FIG. 5 (to the right in FIG. 6), the end of rod 150 comes sufficiently close to reed switch 171 to cause closing of the reed switch contacts. The closing of switch 171 causes the operation of valve control 42, as shown in FIG. 1, through suitable circuitry, so that valve 42 applies pressure to port 117 of four-way valve 12 and relieves the pressure at port 116. This causes the upward movement of valve shaft 100 and valve disks 101 and 102 to their upper sealing position, and reverses the application of fluid to the cylinder-piston assembly 13. Thus, fluid from pressure port 72 now flows into channel 81, through conduit 83, channel 84, and into the chamber to the left of piston 20 in FIG. 5. The piston 20 then moves to the right and the fluid from the right-hand chamber flows through channel 80, return channel 76 and to return port 77. Again, rod 150 moves with piston 20 to generate an output voltage in winding 155 which is related to the speed of movement of piston 20. Once the end of rod 150 reaches a given position adjacent reed switch 170, switch 170 is closed, thereby to operate solenoid valve 42 and to reverse the position of valve 12 to reverse the motion of piston 20. As will be seen, the operation of switches such as reed switches 170 and 171 are used to control the reversal of the polarity of the signal derived from winding 155 and applied to the readout circuitry.

The use of pressure relief valves 60 and 61 in piston 20 permit the interruption of the automatic cycling operation without fear of creating a dangerous differential pressure build-up in the main line.

Referring next to FIG. 9, there is shown the novel readout and control circuit which can be used for the control of the apparatus described above.

FIG. 9 schematically shows the reed switches 170 and 171, rod 150 and coil 155. The output of coil 155 is connected to a signal reversing relay 201, which could have any desired form and operates to reverse the polarity of the input signal from coil 155 such that its output will be unidirectional. That is, the polarity of the output signal of winding 155 will change as the direction of movement of rod 150 changes. In accordance with one aspect of the invention, the imminent reversal of motion of rod 150 is sensed by the operation of reed switches 170 and 171, and this signal is applied to a suitable logic and sequence command circuit 202. Command circuit 202, in turn, causes operation of the signal reversing relay 201 each time switch 170 or 171 operates and ultimately operates valve 42 for reversing the direction of the piston 20. Thus, the velocity signal output voltage from relay 201 will have a constant polarity.

A suitable signal hold circuit is then provided for blanking, or cutting off the velocity signal voltage before the piston reaches the end of its travel. Note that this signal hold should become effective just before the operation of signal reversing relay 201 and is maintained until just after the piston 20 has reversed its direction and begins to move with constant velocity. Thus, the signal output of the signl hold circuit will not be influenced by the transducer voltages during deceleration, standstill, and acceleration of the rod 150 which occurs during rod reversal. Signal hold circuit may take the form of a switching circuit which is operated from command circuit 202 in response to the operation of reed switches 170 and 171.

Actuation of device 203 which can be a relay or other suitable automatically operable switching device isolates the transducer from further influencing the output reading.

During the signal hold interval, the previous signal level output is maintained by a highly stabilized operational amplifier 205 connected as an integrator with capacitors 207 and 220. Before signal hold, feedback resistor 206 and input resistor 221, operating in conjunction with capacitors 207 and 220 and amplifier 205, give a predetermined zero-frequency gain and provide filtering. Variable resistor 216 operating in conjunction with fixed resistor 217 provides adjustment of the amount of feedback and thereby controls the overall closed-loop gain at zero frequency to set calibration.

Capacitors 207 and 220 acting in conjunction with resistors 221 and 206 and amplifier 205 constitute a low-pass filter which smooths the signal by attenuating fluctuations due to transients and the like. Switch 210 removes capacitor 207 from the circuit to reduce the filter effectiveness when observing the analog signal output and during calibration where responsiveness is required to the abrupt rise and fall of the velocity signal waveform with time as is explained later.

The output of operational amplifier 205 is then connected through range selection circuit 208 to a conventional digital readout meter 209. Note that conventional analog meters and oscilloscopes can be connected to the output of amplifier 205 for monitoring the output signal.

The novel circuit of FIG. 9 is also readily calibrated in the field. In the calibration mode, switch 210 may be opened to selectively connect and disconnect capacitor 207 from the circuit switch 210 and switch 211 is closed. Switch 210, when open, disconnects capacitor 207 and connects, to the output of amplifier 205, the flow signal detector 212 and the timing light circuit 213 and timing meter 214. A manual control switch circuit 215 is then connected to the command circuit and is operable to disable the automatic reversing control operation. Thus, when piston 20 reaches the end of its travel, it remains in its end position, and fluid is bypassed through the proper relief valve 60 or 61. The valve 42 is then manually operated to reverse the piston motion. Piston 20 then accelerates rapidly from its rest position to a speed dictated by the flow level of the system. A rapid rising velocity signal is generated during the acceleration of piston 20 and rod 150, and this signal operates flow signal detector circuit 212 which then turns on a suitable timing light 213 and timing meter 214. Once piston 20 reaches the opposite end of its cylinder, the piston stops and its relief valve opens, and the velocity signal drops to zero. This signal deactivates flow signal detector circuit 212 to extinguish light 213 and stop timer 214.

The timing light 213 can be timed with a stop watch and the measured time taken for the piston 20 to travel the length of the barrel is a function of volumetric flow in the piston. The time output of meter 214 can be used instead of timing the light 213. The calculated value is then compared to the indicated value on meter 209 which is fixed by a suitable reading hold command from the command circuit 212 until the unit is reset. Any necessary adjustment in calibration is then made by adjustment of calibration resistor 216.

Preferably, during calibration, switch 210 is opened at the beginning and at the end of the calibration test to minimize the rise and fall time of the signal. The switch 210 can be controlled from command circuit 202. Note that the switch 210 can be held open, if desired, to obtain complete dynamic operation, either under manual or automatic control. This is useful when observing the operation of the system with an oscilloscope to determine transient behavior which would be masked by capacitor 207.

Although this invention has been described with respect to particular embodiments, it should be understood that many variations and modifications will now be obvious to those skilled in the art, and, therefore, the scope of this invention is limited not by the specific disclosure herein, but only by the appended claims.

I claim:

1. A four-way valve comprising, in combination:
a valve body consisting of an elongated body having an elongated opening extending therethrough from one end of said body to the opposite end of said body, first and second spaced fluid passages extending through the wall of said body and communicating with the interior of said elongated opening, first and second port means communicating with the opposite ends of said elongated opening, and a third port means communicating with a region disposed between said first and second fluid passages;
first conduit means for conducting fluid in a single direction, connected to said first and second port means;
second conduit means for conducting fluid in a single direction, connected to said third port means;
and first and second valve means positioned within said elongated opening; said first valve means disposed between the regions at which said first and third port means enter said elongated opening and being movable to selectively connect either one of said first and third port means to said first fluid passage; said second valve means disposed between the regions at which said second and third port means enter said elongated opening and being movable to selectively connect either one of said second and third port means to said second fluid passage;
and operating means connected to said first and second valve means for operating said first and second valve means to define a continuous fluid flow between said first and second fluid passages; said operating means including a mechanism for cycling said first and second valve means between their respective valve positions at a rate dependent upon the volumetric flow of fluid in said first and second passages.

2. The four-way valve of claim 1 wherein said first and second valve means each comprise poppet-type valves which are longitudinally movable within said elongated opening.

3. In combination, the four-way valve of claim 1 and a piston chamber divided into two sections by a shiftable piston therein;

first piston conduit means connecting one said piston chamber section to said elongated opening in the region of said first port means at a location such that movement of said first valve means moves it past said first piston conduit means and selectively connects and disconnects said first conduit means with said first piston conduit means and said first piston chamber section while it respectively disconnects and connects said first piston conduit means and said third port means;

second piston conduit means connecting the other said piston chamber section to said elongated opening in the region of said second port means at a location such that movement of said second valve means moves it past said second piston conduit means and selectively connects and disconnects said first conduit means with said second piston conduit means and said other piston chamber section while it respectively disconnects and connects said second piston conduit means and said third port means;

said first and said second valve means being joined to operate together so that only one of said first and second piston conduit means at a time is connected with said third port means.

4. The four-way valve of claim 1, in which said first and second valve means are mechanically connected to one another and move in unison with one another responsive to operation of said operating means.

5. The four-way valve of claim 4, wherein said first and second valve means are mechanically connected by a shiftable moving device;

said operating means comprising a solenoid device communicating with said moving device such that operation of said solenoid device shifts said moving device, thereby to shift said valves.

6. The four-way valve of claim 4, wherein said operating device is shiftable due to fluid pressure; said operating device having a first operative surface located in a first channel and a second operative surface located in a second channel; first and second fluid pressure port means so connected with said first and second operating device channels, respectively, and said first and said second operative surfaces being so located and oriented that application of fluid pressure to said first port means moves said operating device in one direction and application of fluid pressure to said second port means moves said operating device in the opposite direction, whereby shifting of said operating device and of said valve discs is accomplished through alternating application of fluid pressure to said first and second channels.

7. The four-way valve of claim 6, further including a solenoid operated device having a first and a second mode; said solenoid device being connected with a fluid pressure source on the one hand and being connected with said first port means when in said first mode and with said second port means when in said second mode, whereby said solenoid device controls the shifting of said valve discs.

* * * * *